Dec. 31, 1935.   E. SEIBOLD ET AL   2,025,959
ROTARY MACHINE
Filed May 18, 1934   2 Sheets-Sheet 2

INVENTORS
Ernst Seibold
and Georg Hopfensberger
By
their ATTORNEY

Patented Dec. 31, 1935

2,025,959

UNITED STATES PATENT OFFICE 2,025,959

ROTARY MACHINE

Ernst Seibold and Georg Hopfensberger, Heidenheim-on-the-Brenz, Germany

Application May 18, 1934, Serial No. 726,212
In Germany May 18, 1933

4 Claims. (Cl. 230—79)

The invention concerns a rotary machine for the compression or expansion of air or gases with auxiliary liquid and inside control cylinder, especially in its use as a compressor. In particular the invention refers to the design of the control cylinder of such machine.

As naturally different pressures are exerted upon the circumference of the control cylinder, according to the difference of pressure in the suction and outlet zones, the sealing of the control cylinder with respect to the rotor presents considerable difficulties in practice, especially when a matter of high outlet pressures is concerned. This and other difficulties are advantageously removed by the invention.

In the accompanying drawings:—

Similar characters of reference indicate corresponding parts throughout the various views.

Figure 1:
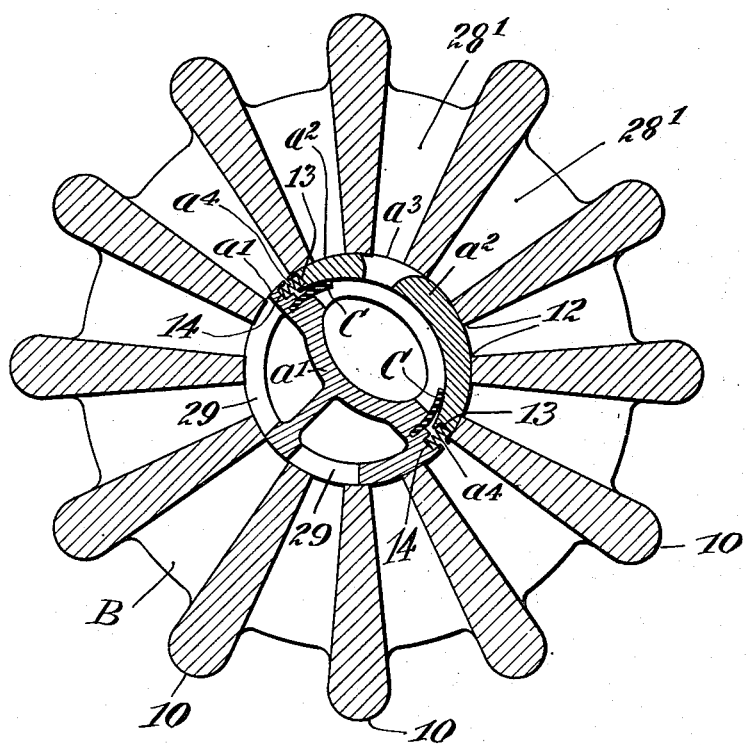
Figure 1 is a sectional view of a rotor having our improvements embodied therein.

The control cylinder A consists of parts $a^1$ and $a^2$, the first of them being on the inlet zone (suction side), the second in the outlet zone (pressure side). The suction side part $a^1$ is rigidly connected to an exterior stationary machine part and can simultaneously, wholly or partly, serve for supporting rotor B. Opposite to $a^1$ and radially movable is arranged the pressure side part $a^2$ so that, from the stationary part $a^1$, $a^2$ can be pressed against the rotor by suitable means in the pressure zone. The clearance between parts $a^1$ and $a^2$ is closed by an elastic packing C.

Pressing of the movable part $a^2$ from stationary part $a^1$ can according to the invention be made by mechanical means, as springs, wedges, cams or a combination of such means with each other. In particular it is also possible to use for this purpose the pressure of the compressed gas itself. As between the two control cylinder parts $a^1$ and $a^2$ the highest end pressure of the compressed medium prevails. This is admitted through the control slot $a^3$. The inside chamber formed between the parts $a^1$ and $a^2$ thereby has an overpressure which will press the control cylinder against the rotor. The last arrangement is especially advantageous, because for varying end pressures the pressing force between cylinder part $a^1$ and rotor automatically adapts itself to the prevailing end pressure. Thus no unnecessary friction making lubrication difficulties is produced at low end pressure as is the case with mechanical pressing devices. Existing difficulties of lubrication may be met by advantageously using as a constant lubricant for the lubrication of the sliding surfaces between the control cylinder and the rotor, an auxiliary liquid, separated from the compressed medium and taken along by it in its movement.

Referring to the drawings, the inner rotor B has a plurality of vanes 10, which have their inner ends contact with the two parts $a^1$ and $a^2$, and rotate about the same. It is important to bring about a snug fit between the inner ends of the vanes 10 and the compression part $a^2$ to avoid leakage of the compressed fluid, as air or the like, and this snug fit is obtained by the action of the springs $a^4$, acting upon the part $a^2$, which springs are of any suitable type, such as a helical spring, having their opposed ends seated in opposed recesses 13 and 14. These springs serve to press the part $a^2$ against the inner ends 12 of the vanes 10.

About the free ends of the vanes 10, the outer rotor 15 has ridges 16 and grooves or valleys 17, of a number, one more than the number of vanes; and this outer rotor 15 is surrounded by a casing 18. The outer rotor 15 with its casing 18 rotates in the direction of the arrow 19.

The rotors as described have a shaft 20, to which the casing 18 is rigidly connected as shown by 21, and which shaft is supported by two supports 22 and 23, each having suitable bearings 24. A drive wheel 24ª for power transmission is keyed to the shaft 20. As the shaft 20 is rotated, the casing 18 and the outer rotor 15, being fixedly positioned therein, are rotated, and thereby the inner rotor is rotated, and the incoming air or the like, enters as shown by the arrow 25, in a channel 26 of the pipe 27, into the spaces 28 between the vanes 10, by means of the openings 29 of part $a^1$. The rotation of the inner rotor 10, causes these spaces 28 to be brought into a position corresponding to the compression position, and thereby the air or the like is compressed, when in such spaces, now indicated by $28^1$; and when space $28^1$ is opposite to the opening $a^3$ of the part $a^2$, then the compressed air or the like enters the channel 30, and passes through the pipe 27, as indicated by the arrow 31.

The pipe 27 has an extension 34 rigidly connected to it with a stuffing box or seal 35, between it and the cover $18^1$ of the casing 18, and another extension member 36, surrounded by a sleeve bearing 37 between it and the casing 18. The pipe 27 is suitably supported and it in turn supports the parts $a^1$ and $a^2$ by means of the flange connection $27^1$.

Figure 2:
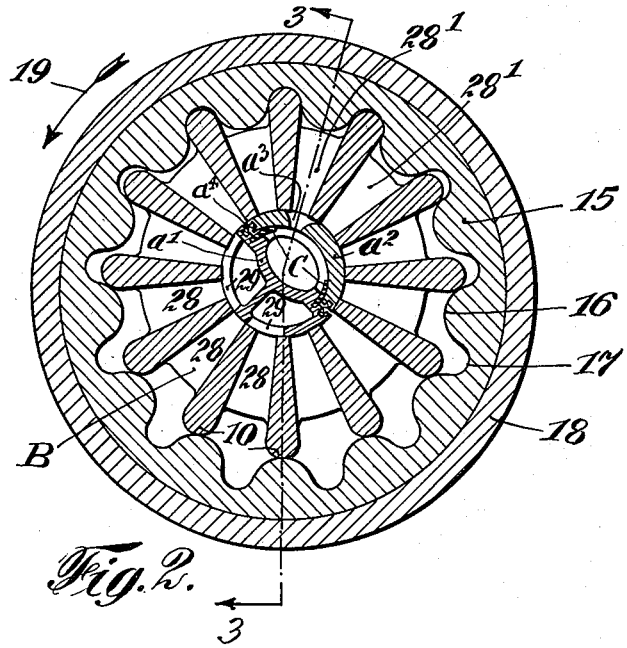
Figure 2 is a similar section of the same part, surrounded however by an outer rotor.
Figure 3:
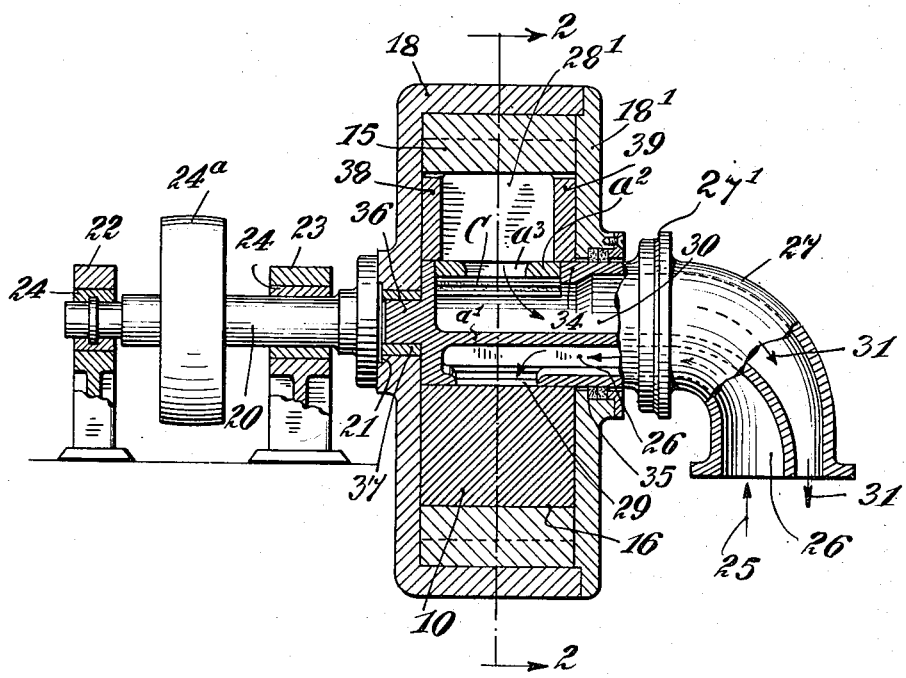
Figure 3 is a longitudinal section taken on line 3—3 of Figure 2.

The vanes 10 and webs 38 and 39 of the inner rotor form therein a plurality of substantially radial recesses 28, which converge towards the center of the rotor. The outer rotor substantially forms a closure for the open sides of the recesses of the inner rotor, thus forming between the two rotors a plurality of chambers or compartments. As the apparatus is rotated, these compartments move in an eccentric motion about the axis of the shaft. Due to the eccentric relation of the inner rotor to the outer rotor, the surface of the outer rotor bounding each chamber moves inwardly relative to the outer walls of the chamber toward the axis of the shaft during one-half of each revolution, and outwardly again during the remainder of the revolution. The effect of this is to alternately increase and decrease the volume of each of the chambers 28. For example, in Figure 2, the uppermost chamber is at substantially minimum volume and the lowermost chamber is at substantially maximum volume. It will be seen that when a given chamber is at its eccentric position nearest the center of the shaft, a groove or valley 17 forms its outer wall and that when the same chamber is at its eccentric position farthest from the axis of the shaft, a ridge 16 forms its outer wall.

In operation, the apparatus preferably carries a certain amount of liquid such as a suitable oil or water, which is contained in the chambers. As the inner and outer rotors rotate together, this oil is thrown outwardly by centrifugal force against the inner surface of the outer rotor. This oil acts as a seal between the inner and outer rotors. The amount of oil carried by each chamber only partly fills the chamber, the remaining portion thereof nearest the axis of rotation being occupied by the gas or other fluid which is to be compressed.

It will have been noted that as is well known to this art, the inner rotor is continually in driving engagement with the outer rotor through the vanes engaging the side surfaces of the ridges and this is a slipping drive, the outer rotor slipping backwardly relative to the inner rotor to the extent of one ridge during each rotation, and the drive being progressively carried by different vanes.

As hereinbefore stated, the particular improvement of this invention resides in the parts $a^1$ and $a^2$ cooperating in the manner described.

While there has been shown an embodiment of our invention, it is nevertheless to be understood that the same is susceptible of more or less modification as to the various details thereof, and we accordingly reserve the privilege of resorting to all such legitimate changes therein as may be fairly incorporated within the spirit and scope of the appended claims.

We claim:

1. In a rotary machine having inner and outer rotors eccentrically disposed, said inner rotor having blades forming spaces for auxiliary fluid and air or gases, a control cylinder at the inner ends of the blades of the inner rotor, divided in its circumferential portion in two parts, one of said parts being for the inlet of the air or gases to be compressed, and being stationary with respect to a part of the rotary machine, the other part being of annular shape, adapted to contact against a plurality of inner parts of the blades and movably disposed against said blades of the inner rotor, and having an opening for the outlet of compressed air or gas coming from the spaces between the blades of the inner rotor.

2. In a rotary machine having inner and outer rotors eccentrically disposed, said inner rotor having blades forming spaces for auxiliary fluid and air or gases, a control cylinder at the inner ends of the blades of the inner rotor, divided in its circumferential portion in two parts, one of said parts being for the inlet of the air or gases to be compressed, and being stationary with respect to a part of the rotary machine, the other part being of annular shape, adapted to contact against a plurality of inner parts of the blades and movably disposed against said blades of the inner rotor, and having an opening for the outlet of compressed air or gas coming from the spaces between the blades of the inner rotor, and means including the compressed air or gases coming from the spaces between the blades of the inner rotor for pressing said movable part against the innermost parts of the inner rotor.

3. In a rotary machine having inner and outer rotors eccentrically disposed, said inner rotor having blades forming spaces for auxiliary fluid and air or gases, a control cylinder at the inner ends of the blades of said inner rotor, divided in its circumferential portion in two parts, one of said parts being for the inlet of the air or gases to be compressed, and being stationary with respect to a part of the rotary machine, the other part being of annular shape, adapted to contact against a plurality of inner parts of the blades and movably disposed against said blades of the inner rotor, and having an opening for the outlet of compressed air or gases coming from the spaces between the blades of the inner rotor, and means disposed between the first part and the second part for pressing the second part away from the first part and against the innermost parts of the inner rotor.

4. In a rotary machine having inner and outer rotors eccentrically disposed, inner rotor having blades forming spaces for said auxiliary fluid and air or gases, a control cylinder at the inner ends of the blades of said inner rotor divided into its circumferential portion in two parts, one of said parts being for the inlet of air or gases to be compressed, and being stationary with respect to a part of the rotary machine, the other part being movable and of annular shape, said movable part being adapted to press against a plurality of the innermost ends of the blades of the inner rotor and having an outlet opening for compressed air or gas coming from the spaces between the blades of the inner rotor, means including the compressed air or gases coming from the spaces between the blades of the inner rotor for pressing said movable part against the innermost parts of the blades of the inner rotor, and spring means disposed between the first part and the second part for pressing the second part away from the first part and against the innermost parts of the blades of the inner rotor.

ERNST SEIBOLD.
GEORG HOPFENSBERGER.